United States Patent
Shiraishi

(10) Patent No.: US 12,439,025 B2
(45) Date of Patent: Oct. 7, 2025

(54) APPARATUS, SYSTEM, METHOD, STORAGE MEDIUM, AND FILE FORMAT

(71) Applicant: CANON KABUSHIKI KAISHA, Tokyo (JP)

(72) Inventor: Yuki Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 17/817,580

(22) Filed: Aug. 4, 2022

(65) Prior Publication Data

US 2023/0047914 A1    Feb. 16, 2023

(30) Foreign Application Priority Data

Aug. 11, 2021 (JP) ................................. 2021-131202

(51) Int. Cl.
| | |
|---|---|
| H04N 19/103 | (2014.01) |
| G06T 9/00 | (2006.01) |
| H04N 19/136 | (2014.01) |
| H04N 19/30 | (2014.01) |
| H04N 19/46 | (2014.01) |

(52) U.S. Cl.
CPC ............. *H04N 19/103* (2014.11); *G06T 9/00* (2013.01); *H04N 19/136* (2014.11); *H04N 19/30* (2014.11); *H04N 19/46* (2014.11)

(58) Field of Classification Search
CPC .... H04N 19/103; H04N 19/136; H04N 19/30; H04N 19/46; H04N 19/00; G06T 9/00–40; G06T 15/506; G06V 10/60
See application file for complete search history.

(56) References Cited

U.S. PATENT DOCUMENTS

| | | | |
|---|---|---|---|
| 6,536,043 B1* | 3/2003 | Guedalia | H04N 21/47205 |
| | | | 348/E7.071 |
| 2003/0026341 A1* | 2/2003 | Li | H04N 19/63 |
| | | | 375/240.18 |
| 2005/0117019 A1* | 6/2005 | Lamboray | H04N 19/20 |
| | | | 348/E13.062 |
| 2008/0091065 A1* | 4/2008 | Oshima | H04N 19/60 |
| | | | 382/128 |
| 2010/0142840 A1* | 6/2010 | Kajiwara | H04N 19/60 |
| | | | 382/244 |
| 2012/0219234 A1* | 8/2012 | Kishi | H04N 19/132 |
| | | | 382/244 |
| 2019/0247021 A1* | 8/2019 | Yamada | A61B 8/5207 |
| 2020/0051285 A1* | 2/2020 | Wihlidal | H04N 19/189 |
| 2020/0252555 A1* | 8/2020 | Choi | H04N 23/66 |
| 2020/0351484 A1* | 11/2020 | Aflaki | G06T 7/41 |
| 2021/0360258 A1* | 11/2021 | Qin | H04N 19/194 |

FOREIGN PATENT DOCUMENTS

JP        2005149390 A      6/2005

* cited by examiner

*Primary Examiner* — Alicia M Harrington
*Assistant Examiner* — Christine Yera Ahn
(74) *Attorney, Agent, or Firm* — Canon U.S.A., Inc. IP Division

(57) ABSTRACT

An apparatus acquires data representing a material appearance of a surface of an object, selects, based on the data, one of a coding method for coding by providing a scalability of a bit plane and a coding method for coding by providing a scalability of resolution, and outputs the data encoded by the selected coding method.

9 Claims, 8 Drawing Sheets

APPARATUS, SYSTEM, METHOD, STORAGE MEDIUM, AND FILE FORMAT

BACKGROUND

Technical Field

The aspect of the embodiments relates to a technique for compressing data regarding the material appearance of an object.

Description of the Related Art

In order to reproduce the material appearance of material of an object and coating, measurement data of reflection characteristics in accordance with an illumination direction and an observation direction are used. In general, the reflection characteristic data is characteristically larger in data amount than still image data because the reflection characteristic data includes information regarding diffuse reflection and specular reflection on an object and information regarding fine unevennesses on the surface of the object. Japanese Patent Application Laid-Open No. 2005-149390 discusses a technique for compressing material appearance information data by dividing an image of a subject into components substantially identical in feature amount based on the feature amounts of the material appearance information data and associating the components with representative values of the feature amounts.

According to Japanese Patent Application Laid-Open No. 2005-149390, however, if a target image includes components that are similar in feature amount but are different in appearance, image quality may degrade depending on the selection of representative values.

SUMMARY

According to an aspect of the embodiments, an apparatus includes an acquisition unit configured to acquire data representing a material appearance of a surface of an object, a selection unit configured to, based on the data, select one of a coding method for coding by providing a scalability of a bit plane and a coding method for coding by providing a scalability of resolution, and an output unit configured to output the data encoded by the selected coding method.

Further features of the disclosure will become apparent from the following description of exemplary embodiments with reference to the attached drawings.

DESCRIPTION OF THE EMBODIMENTS

Hereinafter, exemplary embodiments will be described with reference to the drawings. The following exemplary embodiments do not necessarily limit the disclosure. All of combinations of features described in relation to the exemplary embodiments are not necessarily essential to the solutions of the disclosure.

In a first exemplary embodiment, in the case of encoding material appearance data representing the material appearance of an object, the method of scalable coding is changed depending on the type of material appearance data.

Figure 1A:
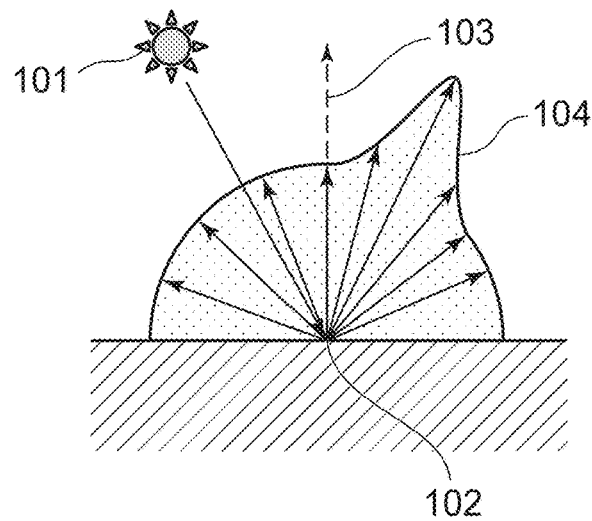
FIGS. 1A to 1C are diagrams for describing reflection characteristics of an object.
Figure 1B:
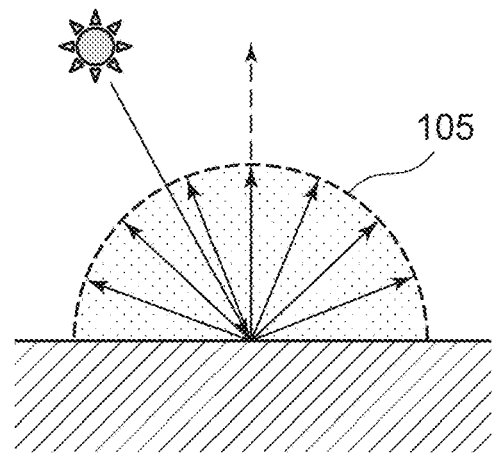
Figure 1C:
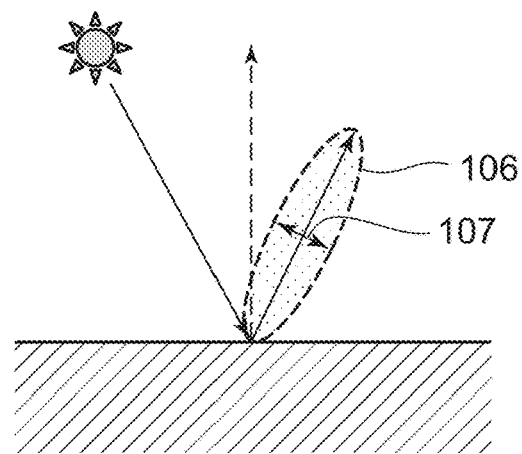

Reflection characteristics of an object will now be described. FIGS. 1A to 1C are diagrams for describing the reflection characteristics of an object. FIG. 1A illustrates reflection light distribution 104 in a case of applying light to a point 102 on the surface of the object with a normal 103, from the direction of a light source 101. The light reflected on the surface of the object is divided into diffuse reflection light 105 illustrated in FIG. 1B and specular reflection light 106 illustrated in FIG. 1C. The diffuse reflection light 105 is formed when incident light is irregularly reflected inside the object and is output to the outside of the object, which is observed at a substantially uniform intensity in every direction. The intensity of the diffuse reflection light 105 is called diffuse reflection intensity. On the other hand, the specular reflection light 106 is formed when incident light is reflected on the surface of the object such that the incident angle and the reflection angle are equal. The reflection intensity at which the intensity of the specular reflection light is maximum is called specular reflection intensity. The specular reflection light has a spread 107 to its surroundings in a specular reflection direction due to fine unevennesses on the surface of the object. The width of the spread 107 of the specular reflection light is called specular reflection width.

<Hardware Configuration of Information Processing Apparatus>

Figure 8:
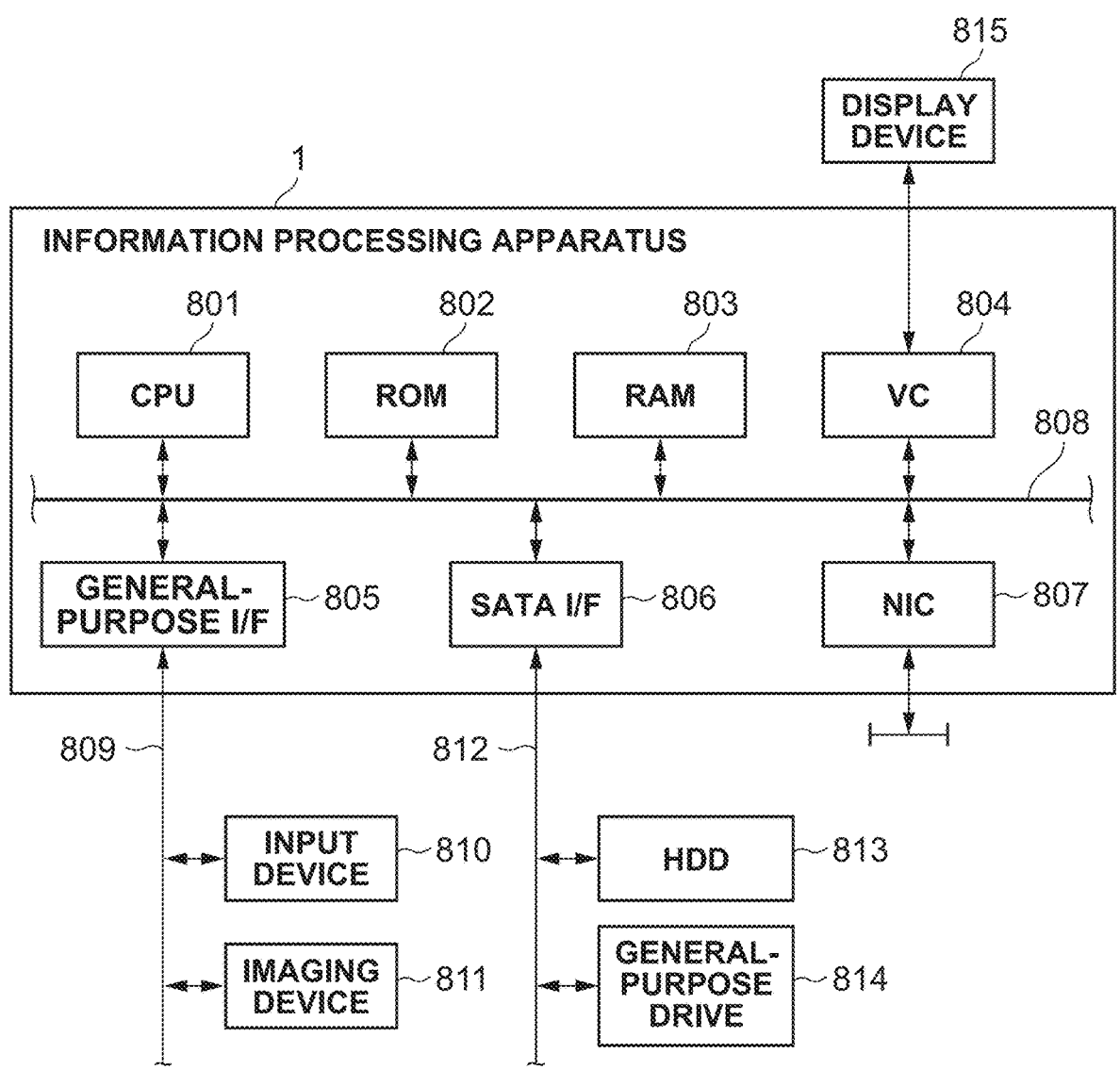
FIG. 8 is a block diagram illustrating a hardware configuration of the information processing apparatus.

FIG. 8 is a block diagram illustrating a hardware configuration of an information processing apparatus 1. The information processing apparatus 1 includes a central processing unit (CPU) 801, a read only memory (ROM) 802, and a random access memory (RAM) 803. The information processing apparatus 1 also includes a video card (VC) 804, a general-purpose interface (I/F) 805, a serial advanced technology attachment (SATA) I/F 806, a network interface card (NIC) 807. The CPU 801 executes an operating system (OS) and various programs stored in the ROM 802, a hard disk drive (HDD) 813, and the like, using the RAM 803 as a work memory. The CPU 801 also controls the components via a system bus 808. The processing described below with reference to the flowchart is started when a program code stored in the ROM 802 or the HDD 813 is read and loaded into the RAM 803 and executed by the CPU 801. The VC 804 is connected to a display device 815. The general-purpose I/F 805 is connected to an input device 810, such as a mouse and a keyboard, and an imaging device 811 via a serial bus 809. The SATA I/F 806 is connected to the HDD 813 and a general-purpose drive 814 that reads and writes various recording media. The NIC 807 inputs and outputs information into and from an external device. The CPU 801 uses the various recording media mounted in the HDD 813 or the general-purpose drive 814, as storage locations of various data. The CPU 801 displays a user interface (UI) provided by the program, on the display device 815, and receives an input of a user instruction or the like accepted via the input device 810. The display device 815 may be a touch panel display having the function of a touch panel that detects the position of a touch by an indicator such as a finger.

<Functional Configuration of Information Processing Apparatus>

Figure 2:
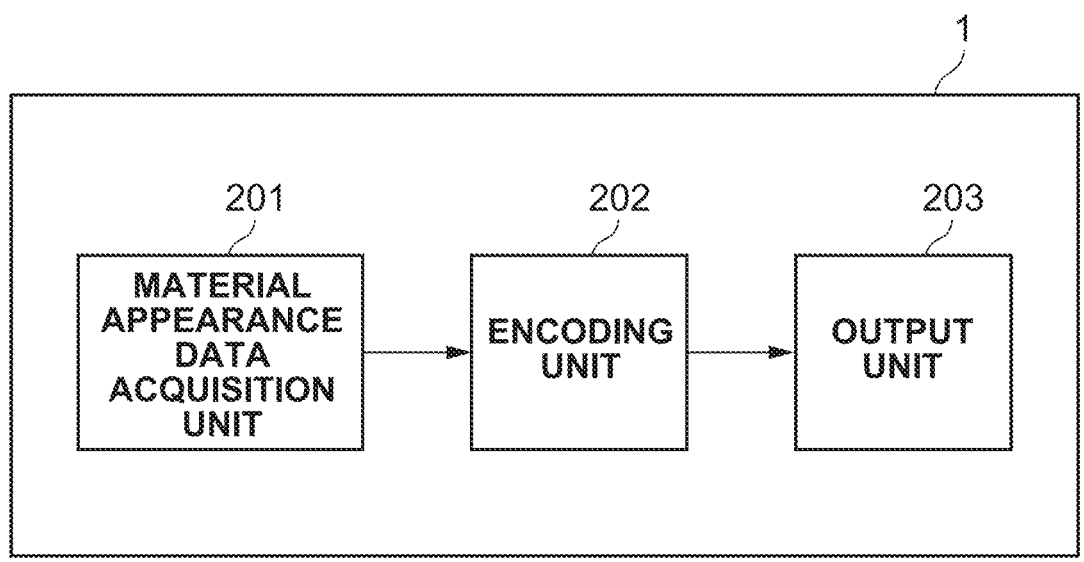
FIG. 2 is a block diagram illustrating a functional configuration of an information processing apparatus.

FIG. 2 is a block diagram illustrating a functional configuration of the information processing apparatus 1. The CPU 801 functions as functional components illustrated in FIG. 2 by reading and executing programs stored in the ROM 802 or the HDD 813 using the RAM 803 as a work memory. All the processes described below do not necessarily need to be executed by the CPU 801. The information processing apparatus 1 may be configured such that some or all of the processes are performed by one or more processing circuits other than the CPU 801.

The information processing apparatus 1 includes a material appearance data acquisition unit 201, an encoding unit 202, and an output unit 203. The material appearance data acquisition unit 201 acquires material appearance data representing the material appearance of an object from a storage device such as the HDD 813. The material appearance data includes diffusion reflection data indicating the diffusion reflection intensity at each position on the object and specular reflection data indicating the specular reflection intensity and the specular reflection width at each position on the object. Specifically, the material appearance data is image data in which material appearance information at each position on the object is associated with pixels. For example, the diffusion reflection data is image data having diffusion reflection intensity in each pixel. The material appearance data may be acquired from a device other than the storage device, such as the imaging device 811. The material appearance data does not necessarily include both the specular reflection data and the diffusion reflection data, and may include only the diffusion reflection data. The encoding unit 202 encodes the material appearance data acquired by the material appearance data acquisition unit 201. The output unit 203 outputs the encoded material appearance data to the storage device such as the HDD 813. The output destination of the encoded material appearance data is not limited to the storage device. For example, the encoded material appearance data may be output to a device that performs rendering on the basis of the material appearance data. The output unit 203 may function as a transmission unit that transmits the encoded material appearance data to another device.

<Processing Executed by Information Processing Apparatus>

Figure 3:
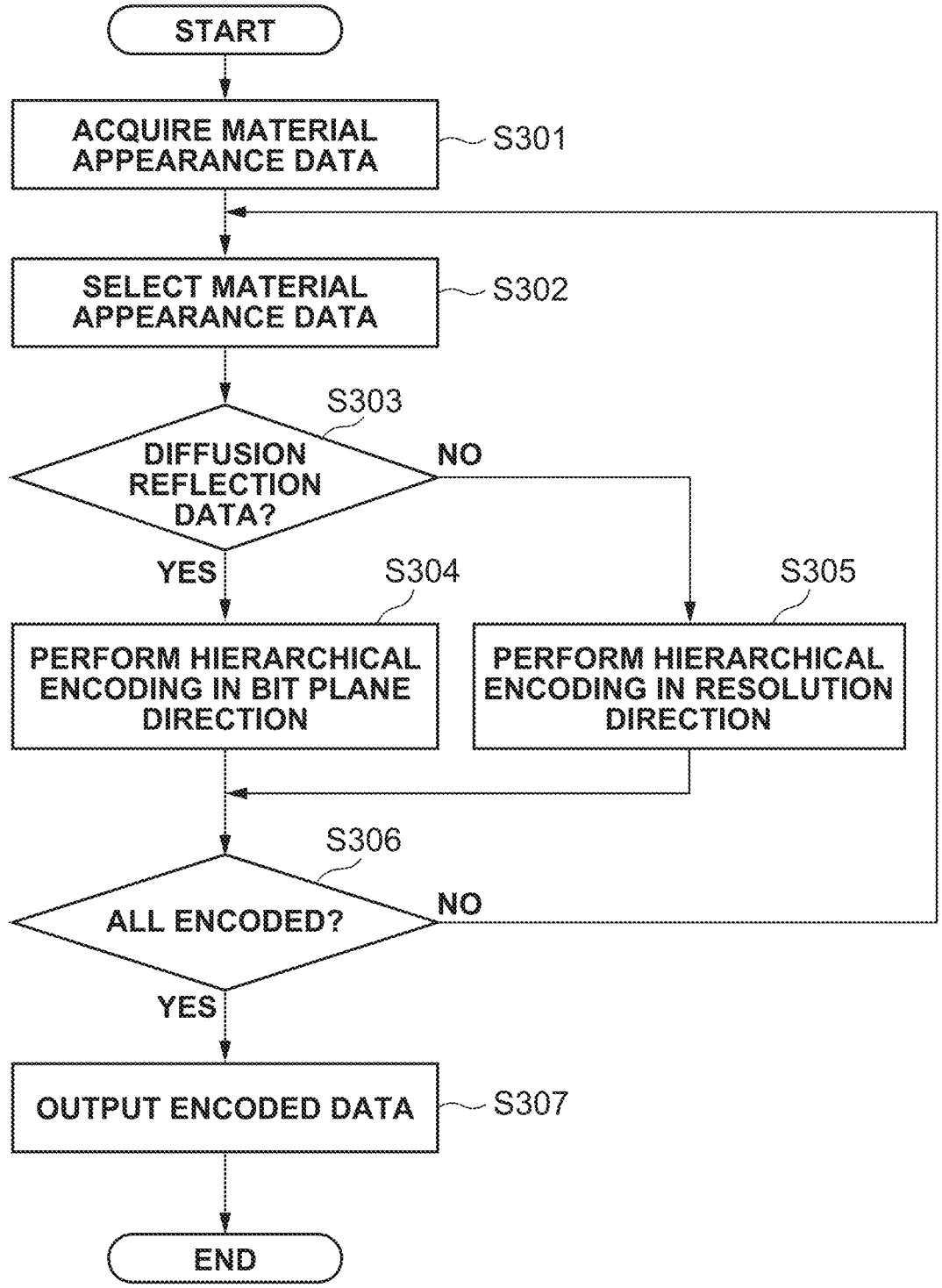
FIG. 3 is a flowchart of a process executed by the information processing apparatus.

A processing flow executed by the information processing apparatus 1 in the present exemplary embodiment will be described with reference to the flowchart in FIG. 3. The processing illustrated in FIG. 3 is started when the user inputs an instruction via the input device 810 and the CPU 801 accepts the input instruction. Hereinafter, each step is denoted with the letter S prefixed to the reference number.

In step S301, the material appearance data acquisition unit 201 acquires material appearance data representing the material appearance of an object from the HDD 813. In step S302, the encoding unit 202 receives the material appearance data acquired by the material appearance data acquisition unit 201 and selects one piece of data included in the received material appearance data. The material appearance data in the present exemplary embodiment includes diffusion reflection intensity as diffusion reflection data, and includes specular reflection intensity and specular reflection width as specular reflection data.

In step S303, the encoding unit 202 determines whether the selected data is diffusion reflection data. If the selected data is diffusion reflection data (YES in step S303), the processing proceeds to step S304. If the selected data is not diffusion reflection data (NO in step S303), the processing proceeds to step S305. If the selected data is diffusion reflection data, the image quality will greatly be affected by a change in resolution. Thus, in step S304, the encoding unit 202 encodes the selected data by providing a scalability of a bit plane. If the selected data is not diffusion reflection data, the image quality will be affected more greatly by a change in gradation rather than a change in resolution. Thus, in step S305, the encoding unit 202 encodes the selected data by providing a scalability of resolution.

The scalable coding is a technique of effectively coding data by providing a plurality of layers. For example, according to JPEG2000 (ISO/IEC15444), discrete wavelet transform is performed to encode a plurality of pieces of data different in spatial resolution as single data. The JPEG coding scheme (ISO/IEC10918-1, ITU-T.81) provides a function of performing progressive display as an extended process. This function is called progressive JPEG. The progressive JPEG prescribes two methods. One method is a method by which DCT coefficients are divided into a plurality of bands and encoding is performed for each band. First, in one embodiment, only the band of the lowest frequency component is encoded and then the remaining bands are encoded in sequence one by one. The other method is a method by which only high-order predetermined bits of all the DCT coefficients are first encoded, and then the subsequent lower-order bits are encoded in sequence bit by bit. In the present exemplary embodiment, the method of encoding for each frequency component band under progressive JPEG is used for scalable coding in the resolution direction, and the method of encoding each bit of the DCT coefficients is used for scalable coding in the bit plane direction.

In step S306, the encoding unit 202 determines whether all the material appearance data acquired by the material appearance data acquisition unit 201 have been encoded. If all the material appearance data have been encoded (YES in step S306), the processing proceeds to step S307. If all the material appearance data have not yet been encoded (NO in step S306), the processing returns to step S302, so that unselected material appearance data is selected. In step S307, the output unit 203 outputs each piece of the encoded material appearance data as an individual piece of encoded data to the HDD 813.

As described above, in the case of encoding the diffusion reflection data, the information processing apparatus according to the present exemplary embodiment performs scalable coding in the bit plane direction in order to maintain the resolution of the diffusion reflection data. In the case of encoding data other than the diffusion reflection data, there is no need to maintain the resolution equivalent to that of the diffusion reflection data, and thus the information processing apparatus performs scalable coding in the resolution direction.

In the case of transmitting the encoded data via a communication path, the output unit 203 can sequentially transmit each piece of the encoded material appearance data in the order of high-quality layers. Thus, even if the bandwidth of the communication path is narrow, the data can be subjected to decoding processing and material appearance reproduction processing upon receipt of the data on the high-quality layers. Selecting the coding method in accordance with the material appearance data makes it possible to reduce the amount of material appearance data while suppressing degradation of the material appearance of the object represented by the material appearance data.

MODIFICATION EXAMPLES

In the present exemplary embodiment, it is determined whether the material appearance data to be encoded is diffusion reflection data, and the method of scalable coding is changed based on the determination result. However, the processing for changing the coding method is not limited to this. For example, it is assumed that the material appearance data includes diffusion reflection intensity, specular reflection intensity, specular reflection width, and normal of the object. In this case, scalable coding in the bit plane direction may be performed for the diffusion reflection intensity and specular reflection intensity, and scalable coding in the resolution direction may be performed for the specular reflection width and normal.

Figure 6:
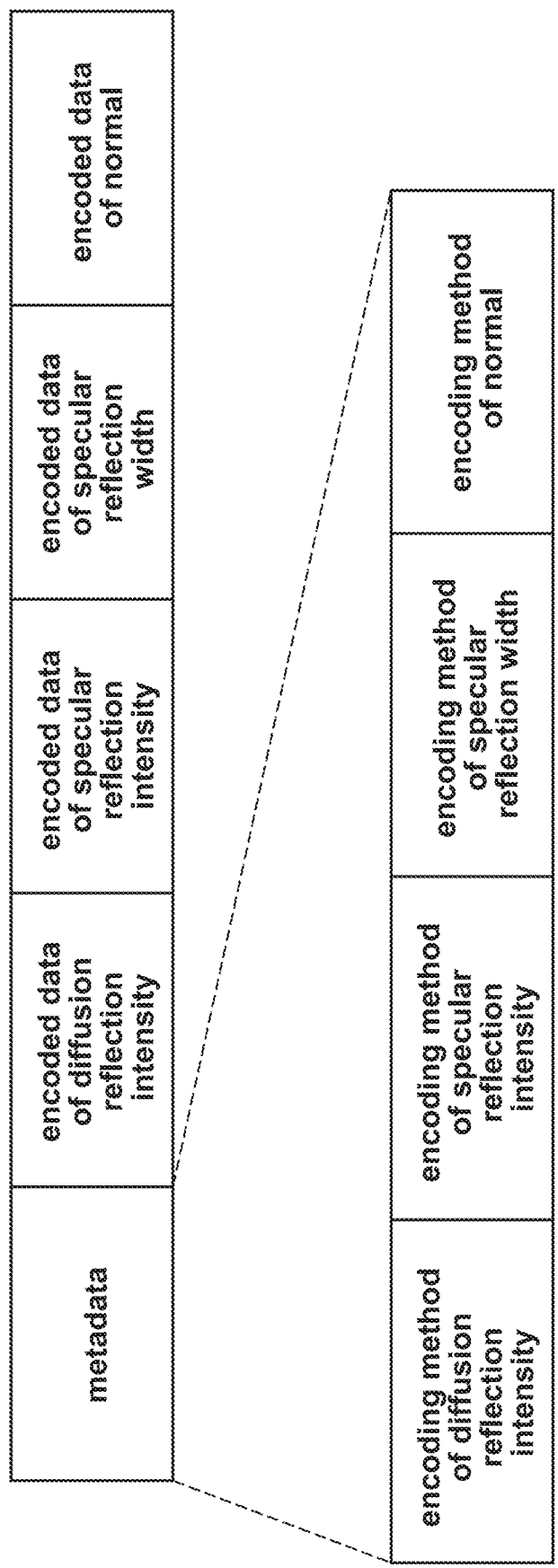
FIG. 6 is a diagram illustrating an example of a file format.

In the present exemplary embodiment, each piece of the encoded material appearance data is output as each individual encoding data. Alternatively, each piece of the encoded data may be stored in one file before outputting. FIG. 6 illustrates an example of an encoded data string stored in one file (file format). In the case of acquiring the diffusion reflection intensity, specular reflection intensity, specular reflection width, and normal as material appearance data to be encoded, information capable of specifying corresponding coding methods is stored as metadata in a metadata part of the encoded data string. In the example of FIG. 6, coding methods are described in the metadata in the order of storage of the material appearance data. However, it is not necessarily required to store one coding method for each piece of the material appearance data as illustrated in FIG. 6. Instead, metadata may be generated such that the material appearance data is associated with the corresponding coding methods.

In the present exemplary embodiment, the information processing apparatus 1 selects the coding method based on the material appearance data and encodes the material appearance data using the selected coding method. Alternatively, the information processing apparatus 1 may be a system that transmits and receives the material appearance data. Specifically, the information processing apparatus 1 includes, as the output unit 203, a transmission unit that transmits the material appearance data encoded in the processing according to the first exemplary embodiment to another information processing apparatus. This transmission unit may transmit the material appearance data via wireless communication or may transmit the material appearance data via wired communication. Another information processing apparatus having a reception unit that receives the encoded material appearance data in a wireless or wired manner decodes the material appearance data by using the coding method selected by the information processing apparatus 1.

The material appearance data in the present exemplary embodiment is held as image data in which the material appearance information at each position on the object is associated with pixels. Alternatively, the material appearance data may be provided in another format, such as a function or a lookup table, as long as the material appearance data represents the material appearance information at each position on the object.

In the first exemplary embodiment, encoding is performed while the method of scalable coding is changed in accordance with the type of the material appearance data. In a second exemplary embodiment, the method of scalable coding is changed by analyzing the diffusion reflection data in the material appearance data. The hardware configuration of an information processing apparatus in the present exemplary embodiment is equivalent to that of the first exemplary embodiment, and thus description thereof will be omitted. Hereinafter, differences of the present exemplary embodiment from the first exemplary embodiment will be mainly described. The components of the present exemplary embodiment identical to those of the first exemplary embodiment will be described with identical reference signs.

<Functional Configuration of Information Processing Apparatus>

Figure 4:
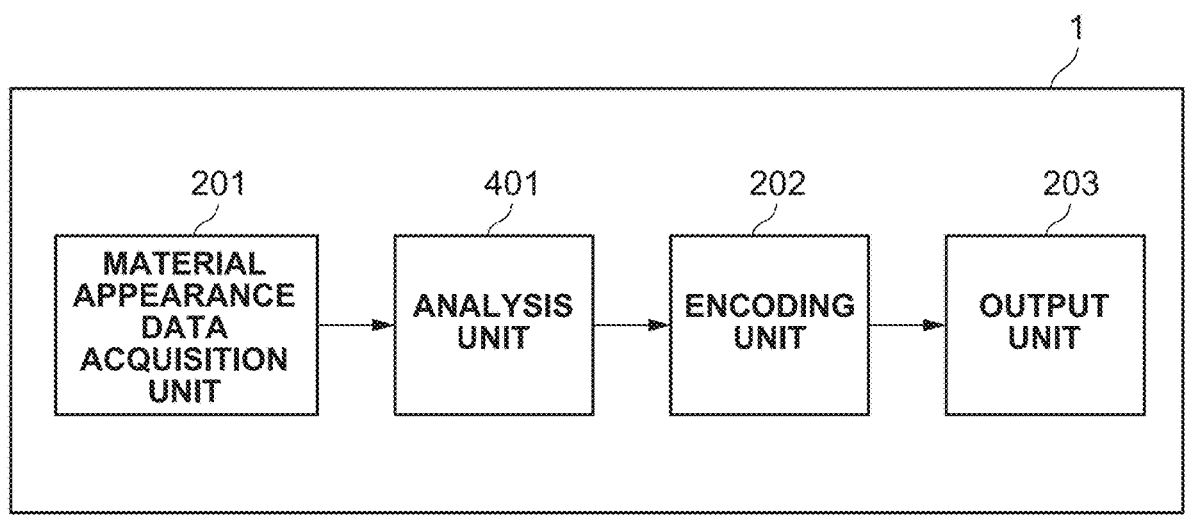
FIG. 4 is a block diagram illustrating a functional configuration of the information processing apparatus.

FIG. 4 is a block diagram illustrating a functional configuration of an information processing apparatus 1. A CPU 801 functions as the functional components illustrated in FIG. 4 by reading and executing the programs stored in a ROM 802 or an HDD 813 using a RAM 803 as a work memory. All the processes described below do not necessarily be executed by the CPU 801. The information processing apparatus 1 may be configured such that some or all of the processes are performed by one or more processing circuits other than the CPU 801.

The information processing apparatus 1 includes a material appearance data acquisition unit 201, an analysis unit 401, an encoding unit 202, and an output unit 203. The analysis unit 401 analyzes the material appearance data acquired by the material appearance data acquisition unit 201. Specifically, the analysis unit 401 converts the diffusion reflection intensity indicated by the diffusion reflection data into spatial frequency components, and determines whether the diffusion reflection intensity includes many high-frequency components or many low-frequency components. The material appearance data acquisition unit 201 in the present exemplary embodiment acquires diffusion reflection data indicating diffusion reflection intensity, specular reflection data indicating specular reflection intensity and specular reflection width, and normal data indicating normal distribution in the object.

<Processing Executed by Information Processing Apparatus>

Figure 7:
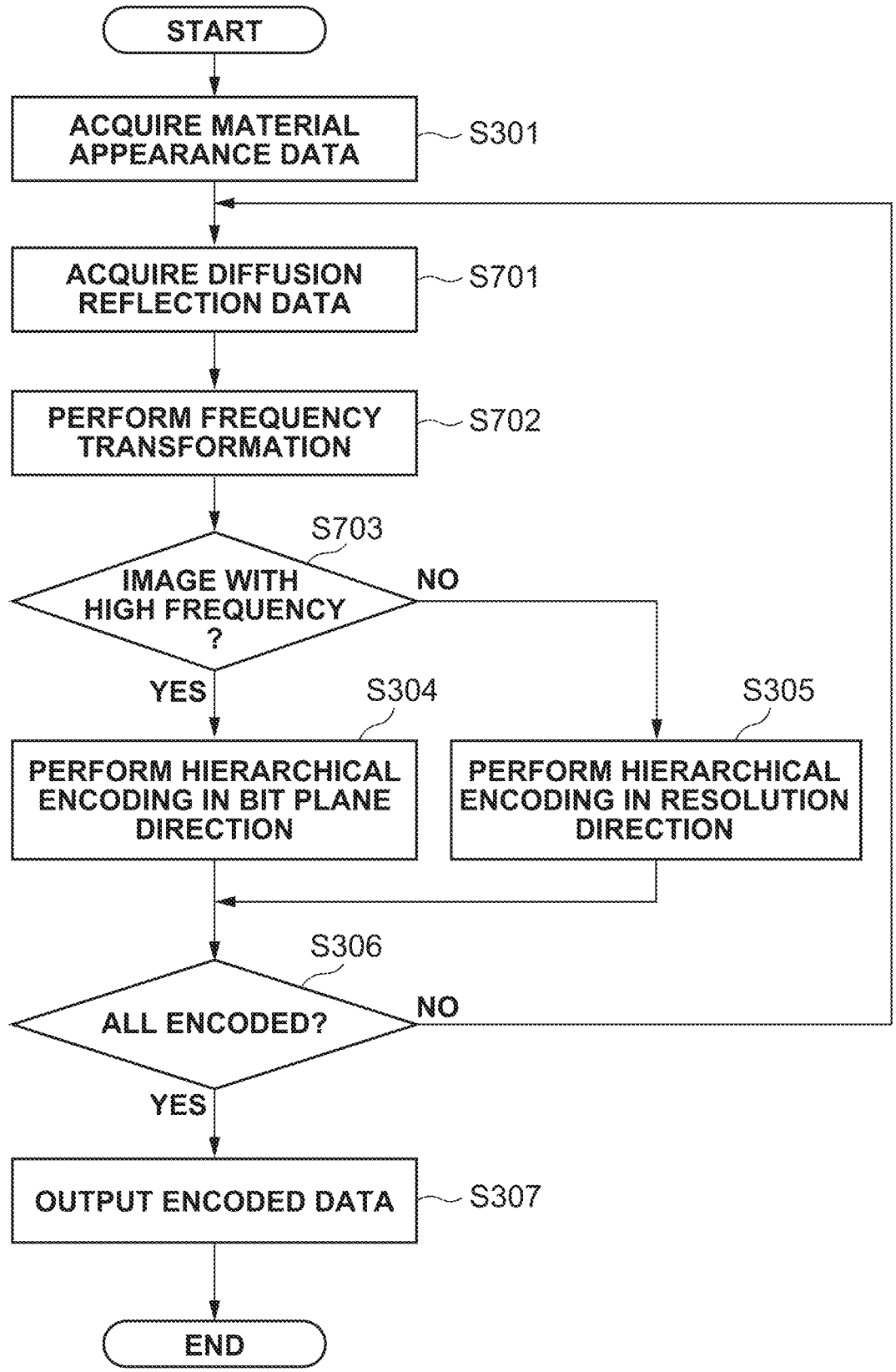
FIG. 7 is a flowchart of a process of analyzing material appearance data.

A processing flow executed by the information processing apparatus 1 in the present exemplary embodiment will be described with reference to the flowchart in FIG. 7. The processing illustrated in the flowchart of FIG. 7 is started when the user inputs an instruction via an input device 810 and the CPU 801 accepts the input instruction.

In step S301, the material appearance data acquisition unit 201 acquires the material appearance data representing the material appearance of an object from the HDD 813. In step S701, the analysis unit 401 acquires the diffusion reflection data from the material appearance data acquired by the material appearance data acquisition unit 201. In step S702, the analysis unit 401 transforms the diffusion reflection intensity indicated by the acquired diffusion reflection data into spatial frequency components. The transformation into spatial frequency components can be performed by using widely known Fourier transformation, wavelet transformation, DCT transformation, or the like.

In step S703, the analysis unit 401 determines whether the diffusion reflection data is image data that includes many high frequency components or is image data that includes many low frequency components, based on the spatial frequency components of the diffusion reflection intensity. If the analysis unit 401 determines that the diffusion reflection data is image data that includes many high frequency components (YES in step S703), the processing proceeds to step S304. If the analysis unit 401 determines that the diffusion reflection data is image data that includes many low frequency components (NO in step S703), the processing proceeds to step S305. The processing in steps S304 to S307 is the same as that in the first exemplary embodiment and thus description thereof will be omitted.

As described above, scalable coding can be performed in the bit plane direction to maintain the resolution for an image including many high frequency components. For an image including many low frequency components, scalable coding is performed in the resolution direction to maintain the gradation because the resolution is less important than the image including many high frequency components. Selecting the coding method in accordance with the analysis results of the material appearance data makes it possible to reduce the amount of material appearance data while suppressing degradation of the material appearance of the object represented by using the material appearance data.

MODIFICATION EXAMPLE

Figure 5:
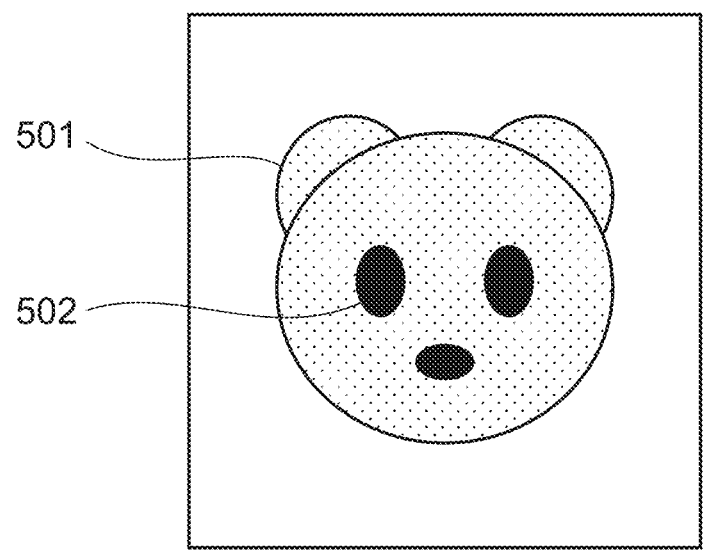
FIG. 5 is a diagram illustrating an example of an object including regions different in material.

In the present exemplary embodiment, the diffusion reflection data is analyzed in the entire image. Alternatively, the diffusion reflection data may be analyzed in each area of the image. FIG. 5 is a diagram illustrating an example of an object with a mixture of areas different in material. An area 501 corresponds to a fluffy material such as fur of a stuffed animal. An area 502 corresponds to a material with a smooth surface such as plastic. As in the example of FIG. 5, in the case of compressing the material appearance data of an object with a mixture of areas different in material, image quality degradation may occur if the same scalable coding is performed in the entire image. Thus, the coding method may be determined after the image is divided into a plurality of areas and each area is analyzed. Otherwise, after transformation into spatial frequency components, the image may be divided through analysis of the spatial frequency components in each area and the coding method may be determined for each divided area.

In the present exemplary embodiment, the coding method for all the material appearance data is determined based on the analysis results of the diffusion reflection data. Alternatively, the coding method for the other pieces may be determined based on the analysis result of any one piece of the material appearance data. For example, the analysis unit 401 analyzes the specular reflection intensity, and the encoding unit 202 changes the coding method of the specular reflection width based on the analysis results of the specular reflection intensity. Specifically, the value of the specular reflection width tends to be small if the value of the specular reflection intensity is large. Thus, the encoding unit 202 performs the scalable coding in the bit plane direction, considering that the image quality is greatly affected by a reduction in the resolution. If the value of the specular reflection intensity is small, the value of the specular reflection width tends to be large. Thus, the encoding unit 202 performs the scalable coding in the resolution redirection, considering that the image quality is greatly affected by a reduction in the gradation.

The encoding unit 202 may also determine the coding method of normal information on the basis of the analysis results of the specular reflection width. Specifically, detailed normal information is required if the value of the specular reflection width is small, and thus the encoding unit 202 performs the scalable coding in the bit plane direction to maintain the resolution. If the value of the specular reflection width is large, no detailed normal information is required, and thus the encoding unit 202 performs the scalable coding in the resolution direction.

According to the aspect of the embodiments, it is possible to reduce the amount of material appearance data while suppressing degradation of the material appearance of an object represented by the material appearance data.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-131202, filed Aug. 11, 2021, which is hereby incorporated by reference herein in its entirety.

What is claimed is:

1. An apparatus comprising:
one or more processors; and
one or more memories storing instructions executable by the one or more processors to cause the apparatus to perform operations comprising:
acquiring data representing a material appearance of a surface of an object;
selecting, based on the data, one of a coding method for coding by providing a scalability of a bit plane and a coding method for coding by providing a scalability of resolution; and
outputting the data encoded by the selected coding method, wherein if the data is data regarding diffusion reflection intensity, the one or more processors select the coding method for coding by providing a scalability of the bit plane.

2. The apparatus according to claim 1, wherein the one or more processors encode the data based on the selected coding method,
wherein the one or more processors output the encoded data.

3. The apparatus according to claim 1, wherein the wherein the one or more processors analyze the data and select the coding method for encoding the data based on a result of the analysis.

4. The apparatus according to claim 1, wherein if the data is data regarding specular reflection intensity, the one or more processors select the coding method for coding by providing a scalability of the bit plane.

5. The apparatus according to claim 1, wherein if the data is data regarding a spread of specular reflection light, the one or more processors select the coding method for coding by providing a scalability of the resolution.

6. The apparatus according to claim 1, wherein if the data is data regarding a normal, the one or more processors select the coding method for coding by providing a scalability of the resolution.

7. The apparatus according to claim 1, wherein if the data is data regarding diffusion reflection intensity or data regarding specular reflection intensity, the one or more processors select the coding method for coding by providing a scalability of the bit plane, and if the data is data regarding a spread of specular reflection light or data regarding a normal, the one or more processors select the coding method for coding by providing a scalability of the resolution.

8. A non-transitory computer-readable storage medium storing instructions that, when executed by a computer, cause the computer to perform a method, the method comprising:
acquiring data representing a material appearance of a surface of an object;
selecting, based on the data, one of a coding method for coding by providing a scalability of a bit plane and a coding method for coding by providing a scalability of resolution; and
outputting the data encoded by the selected coding method,
wherein if the data is data regarding diffusion reflection intensity, the coding method for coding by providing a scalability of the bit plane is selected.

9. The non-transitory computer-readable storage medium according to claim 8, further comprising encoding the data based on the selected coding method,
wherein the outputting outputs the encoded data.

* * * * *